(12) United States Patent
Schoessow et al.

(10) Patent No.: US 12,048,923 B2
(45) Date of Patent: Jul. 30, 2024

(54) SLURRY PHASE REACTOR WITH INTERNAL CYCLONES

(71) Applicant: KELLOGG BROWN & ROOT LLC, Houston, TX (US)

(72) Inventors: Cassandra Schoessow, Pearland, TX (US); Douglas Piotter, Katy, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 64 days.

(21) Appl. No.: 17/833,757

(22) Filed: Jun. 6, 2022

(65) Prior Publication Data

US 2023/0211303 A1    Jul. 6, 2023

Related U.S. Application Data

(62) Division of application No. 17/148,212, filed on Jan. 13, 2021, now Pat. No. 11,376,558.

(60) Provisional application No. 62/960,465, filed on Jan. 13, 2020.

(51) Int. Cl.
| | |
|---|---|
| *C10G 1/10* | (2006.01) |
| *B01J 8/00* | (2006.01) |
| *B01J 8/26* | (2006.01) |
| *C10G 1/00* | (2006.01) |
| *C10G 11/18* | (2006.01) |

(52) U.S. Cl.
CPC ........... *B01J 8/0055* (2013.01); *B01J 8/0065* (2013.01); *B01J 8/26* (2013.01); *C10G 1/002* (2013.01); *C10G 1/10* (2013.01); *C10G 11/18* (2013.01); *B01J 2208/00761* (2013.01); *C10G 2300/1003* (2013.01); *C10G 2300/1011* (2013.01); *C10G 2300/107* (2013.01); *C10G 2300/1077* (2013.01)

(58) Field of Classification Search
None
See application file for complete search history.

(56) References Cited

U.S. PATENT DOCUMENTS

| | | |
|---|---|---|
| 2,378,342 A | 6/1945 | Voorhees et al. |
| 3,074,878 A | 1/1963 | Pappas |
| 3,607,129 A | 9/1971 | Carson |
| 3,785,962 A | 1/1974 | Conner et al. |
| 11,376,558 B2 | 7/2022 | Schoessow et al. |
| 2006/0094916 A1 | 5/2006 | Lacijan et al. |
| 2007/0138059 A1* | 6/2007 | Farshid .................. C10G 65/02 208/57 |
| 2008/0207973 A1 | 8/2008 | Palmas et al. |
| 2010/0065472 A1* | 3/2010 | Chabot .................. C10G 65/12 208/57 |
| 2010/0239475 A1 | 9/2010 | Liu et al. |

(Continued)

OTHER PUBLICATIONS

Wikipedia 'ZSM-5' Feb. 18, 2019 (Feb. 18, 2018) retrieved from <https://en.wikipedia.or/w/index.php?title=ZSM-5&oldid=826396607> entirety of document especially p. 1 para 1 (4 pages).

(Continued)

*Primary Examiner* — Tam M Nguyen
(74) *Attorney, Agent, or Firm* — Gary M. Machetta

(57) ABSTRACT

A system for processing a hydrocarbon feed has a final stage reactor and internal separator with cyclone that forms a substantially gas stream and a substantially non-gas stream. The substantially gas stream is sent directly from the final stage reactor and separator to further downstream processing.

6 Claims, 3 Drawing Sheets

(56) References Cited

U.S. PATENT DOCUMENTS

| | | | |
|---|---|---|---|
| 2011/0240522 A1* | 10/2011 | Stine | B01J 8/0055 |
| | | | 422/187 |
| 2012/0108876 A1 | 5/2012 | Chewter et al. | |
| 2018/0079974 A1 | 3/2018 | Kokayeff et al. | |
| 2019/0195574 A1 | 6/2019 | Vargas et al. | |
| 2020/0094211 A1 | 3/2020 | Panchal | |
| 2020/0325399 A1 | 10/2020 | Gai et al. | |
| 2021/0214624 A1* | 7/2021 | Schoessow | B01J 8/0055 |
| 2021/0246387 A1* | 8/2021 | Koseoglu | C10G 45/44 |
| 2022/0033713 A1 | 2/2022 | Li et al. | |
| 2022/0289655 A1* | 9/2022 | Slivensky | C10G 1/10 |
| 2022/0290053 A1* | 9/2022 | Mleczko | C10B 53/07 |
| 2022/0298437 A1* | 9/2022 | Urade | C10G 9/32 |
| 2023/0183582 A1* | 6/2023 | Basha | C10G 11/18 |
| | | | 585/241 |
| 2023/0212367 A1* | 7/2023 | DeBruin | B01D 19/0005 |
| | | | 521/47 |

OTHER PUBLICATIONS

Wikipedia 'Syngas' Jan. 30, 2019 (Jan. 30, 2019) retrieved from <https://en.wikipedia.org/w/index.php?title=Syngas&oldid=880937869> entirety of document especially p. 1 para 1 (11 pages).

CountryMark 'Slurry oil' Dec. 2012 retrieved from <https://www.countrymark.com/countrymark/Portals/O/documents/Slurry_Oil_December_2012.pdf> entirety of document especially para 1 para 1-2 (4 pages).

International Search Report and Written Opinion for International Application No. PCT/US21/13268 filed Jan. 13, 2021 received from International Search Authority on Apr. 2, 2021 (13 pages).

* cited by examiner

SLURRY PHASE REACTOR WITH INTERNAL CYCLONES

CROSS-REFERENCE TO RELATED APPLICATION

This application is a divisional application and claims priority to U.S. application Ser. No. 17/148,212 filed on Jan. 13, 2021, now U.S. Pat. No. 11,376,558, which claims the benefit of U.S. Provisional Application Ser. No. 62/960,465 filed Jan. 13, 2020, incorporated herein by reference in its entirety.

BACKGROUND

1. Field

The present disclosure relates to slurry phase reactors and methods for processing hydrocarbon feeds such as residual oil.

2. Description of the Related Art

A conventional process for processing hydrocarbon feeds is a slurry-phase reactor hydrocracking technology, such as in an up-flow bubble column reactor. This slurry phase process, commonly referred to as VCC technology, generally includes two main reaction processes, namely, a liquid phase hydrogenation treatment (LPH), which mainly cracks the hydrocarbon feed, and gas phase hydrogenation (GPH), which treats and further cracks the hydrocarbon. Generally, a hydrocarbon feed is first mixed with one or more additives and hydrogen. Next, the combined feed enters a bubble column reactor with hydrogen under high pressure and temperature, which causes a cracking reaction. The cracking reaction is typically induced by increased temperatures (thermal cracking) or by an acid catalyst (catalytic cracking). Hydrocracking is a particular type of cracking reaction that takes place in a hydrogen rich environment. The additive may or may not increase chemical reactions with the hydrocarbon feed. Additional hydrodesulfurization (hydrotreating sulfur-containing compounds to produce hydrogen sulfide byproduct), hydrodenitrogenation (hydrogenating nitrogen-containing compounds to product ammonia byproduct), olefin saturation, aromatic saturation, and isomerization reactions may also take place. Afterwards, the product enters a separator to produce a vaporous converted product and a liquid slurry unconverted product.

Referring to FIG. 1, there is shown a prior art slurry phase reactor and separation system 10 for converting a vacuum residue into lighter, more valuable products. The system 10 may include a plurality of reactors 12, 14, 16, a hot separator 18, and a cyclone 20. A hydrocarbon feed 22 is directed into the serially-arranged reactors 12, 14, 16, which operate between 100 and 350 bar, and typically at about 200 bar. The hydrocarbon feed 22 may be a vacuum residue feed, slurry oils, coal tars, visbreaker tars, atmospheric residue, a coal feed, etc. Alternative hydrocarbon feeds may contain bitumen, coal+hydrocarbon oil mixture, mixtures of plastic and residue, mixtures of biomass and petroleum. Additives, such as carbonaceous type material, may be added to the feed 22. Other additives may contain iron or other metal based catalyst, carbon type impregnated with various metals, sodium salts. The product from the reactors 12, 14, 16 exit as a three phase mix of vapor, liquid, and solids. After cooling the mix to stop further reactions and reduce coke forming reactions using a variety of methods including heat exchanging with cooler streams, injection of $H_2$, and injection of liquid hydrocarbon such as gas oil, the product is sent to the hot separator 18, which forms a first stream 24 composed of unconverted liquid slurry material and the additive(s) and a second lighter gaseous fluid stream 26, which may be referred to as vapor product. The vapor product 26 is sent to the cyclone 20. The cyclone 20 is a separator that uses inertia and a spiral vortex to remove small droplets of liquid and solid particles before the fluid streams enters a gas phase (GPH) reactor for further hydroprocessing. The GPH reactor can be a hydrotreater or a mix of hydrotreating and hydrocracking reactors.

The hot separator and the cyclone are expensive vessels to manufacture due to the high temperature and pressure at which they operate. Thus, there is a continuing need for new apparatus and methods for reducing the capital cost of such systems.

SUMMARY

In aspects, the present disclosure provides a system for processing a hydrocarbon feed. The system may include a plurality of serially aligned reactors. The plurality of reactors may include a final stage reactor that includes: a vessel, an inlet formed in the vessel for receiving the hydrocarbon feed, a reactor section formed in the vessel, the reactor section receiving the hydrocarbon feed via the inlet; and a separator section formed in the vessel, the separator section configured to form a substantially gas stream and a substantially non-gas stream. The separator section may include: a nozzle separating the reactor section from the separator section, the nozzle having an opening directing the hydrocarbon feed, hydrogen, and reaction products from the reactor section to the separator section, a first outlet formed in the vessel from which the substantially non-gas stream exits the vessel; at least one cyclone separator configured to produce the substantially gas stream; and a second outlet from which the substantially gas stream exits the vessel.

In aspects, the present disclosure provides a method for processing a hydrocarbon feed. The method may include the steps of flowing the hydrocarbon feed through a plurality of serially aligned reactors; forming a substantially gas stream and a substantially non-gas stream in a final stage reactor of the plurality of reactors, wherein the substantially gas stream is produced by at least one cyclone separator; and sending the substantially gas stream directly from the final stage reactor to a separator.

It should be understood that examples of certain features of the disclosure have been summarized rather broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

Figure 2:
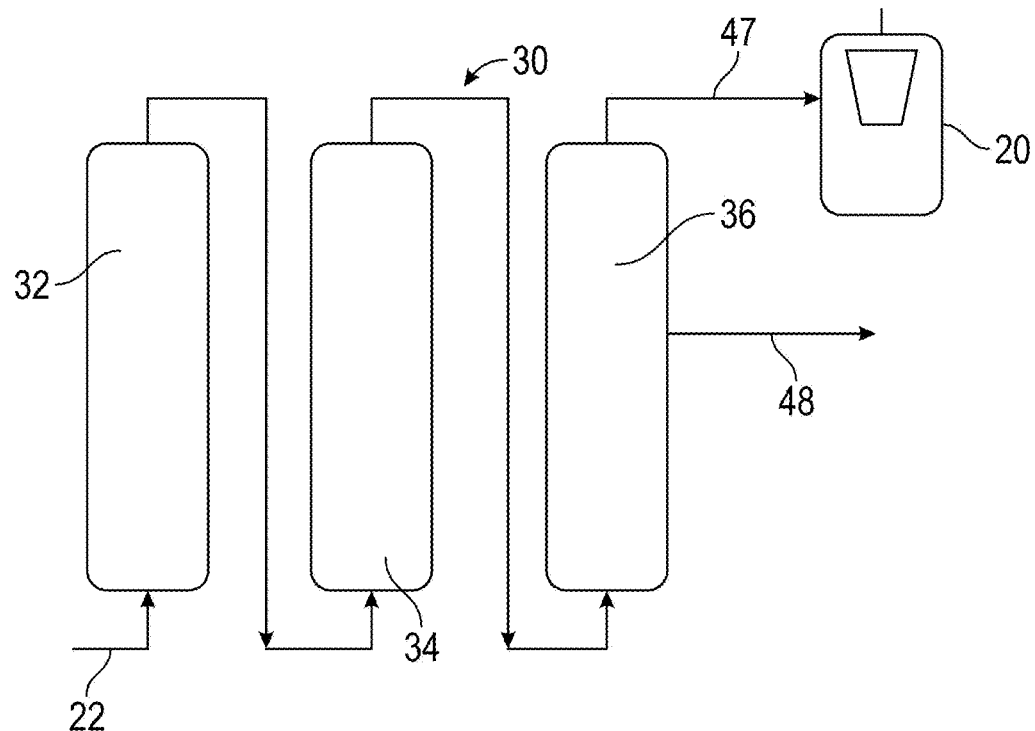
FIG. 2 schematically illustrates one embodiment of a VCC slurry phase reactor and separation system according to the present disclosure.

Referring to FIG. 2, there is shown a slurry phase reactor and separation system 30 in accordance with one embodiment of the present disclosure for producing products such as naphtha, diesel, and gas oil from a hydrocarbon feed 22. The hydrocarbon feed 22 may include coal tar, slurry oil, atmospheric residues, vacuum residues, coals, biomass, plastics, visbreaker tar or solvent deasphalting pitches, etc. The hydrocarbon feed 22 may also include any hydrocarbon stream wherein a majority of the stream (i.e., more than fifty percent) boils above 350 degrees C. (662 degrees F.). The feed 22 may include a lighter material, which is defined as a material having a normal boiling point above 500° C. The system 30 may include a plurality of serially-arranged reactors 32, 34, 36, and a cyclone separator 20. The reactors 32, 34, 36 may be any vessel having a body suitable for reacting three-phases, i.e., solids, liquids, and gases, simultaneously, to form contents using an upward flowing, back-mixed flow regime. The reactor 32 is consider a "first stage" reactor because it is the first reactor through which the oil feed 22 is reacted with an additive. The reactor 36 is considered a "final stage" reactor because it is the last reactor through which the oil feed 22 is reacted with an additive. The reactors 32, 34, 36 include a catalyst or additive suspended in a fluid through which a hydrogen gas flows. The flow regime may be churn turbulent or a bubble flow. While in the reactors 32, 34, 36, the feed 22 may be reacted with one or more additives, such as an activated carbon, iron or other metal based catalyst, carbon type impregnated with various metals, sodium salts, at approximately between 100-350 bar, and typically 200 bar. A substantially gas stream 47 exiting the final stage reactor 36 enters the cyclone separator 20, which removes small droplets of liquid and particles of solid before the gas stream enters a GPH reactor for further hydroprocessing. The terms catalyst and additive may be used interchangeably. The same or different additive may be used in each of the reactors 32, 34, 36.

Figure 3:
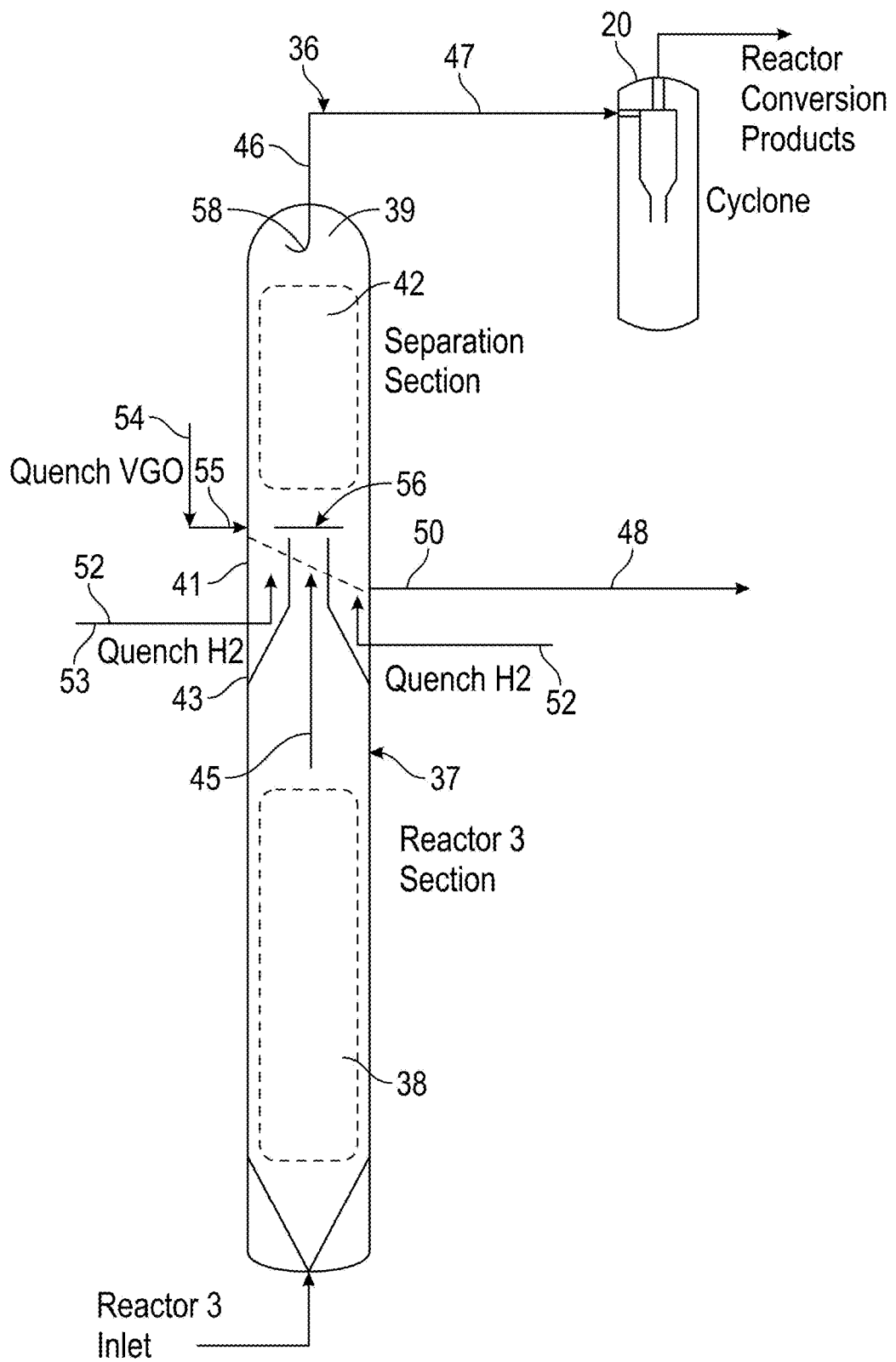
FIG. 3 schematically illustrates a final stage reactor according to one embodiment of the present disclosure.

FIG. 3 illustrates one embodiment of the final stage reactor 36. The final stage reactor 36 includes a vessel 37 within which a reactor section 38 and a separator section 42 are formed. A nozzle 43 has an opening that directs an effluent 45 from the reactor section 38 into the separator section 42 in an axial direction, i.e., aligned with the length of the vessel 37. The nozzle 43 may be any structure having an opening that restricts fluid flow. Thus, an inlet to the nozzle 43 has a larger cross-sectional flow area than an outlet of the nozzle 43. In embodiments, an upper end 39 of the separator section 42 may be formed concave in order to slope to a vapor outlet 46. The reactor section 38 is configured to react the slurry from the reactor 34 as discussed above; e.g., at high pressure and in the presence of hydrogen.

The separator section 42 is configured to produce two product streams. A first stream 47 comprising of substantially a gas exits from the overhead vapor outlet 46 to the cyclone separator 20. A second stream 48 comprising substantially of a non-gas stream, e.g., unconverted liquids and solids, exit from a second outlet 50. By "substantially," it is meant that at least a majority of the stream 47 is a gas and a majority of the stream 48 is unconverted liquids and solids. In embodiments, "substantially" may mean at least 60%, 70%, 80%, or 90%.

In embodiments, one or more streams 52 of cool hydrogen may be injected into the separator section 42 via a quench inlet 53 to cool the slurry and slow coking reactions. By "cool," it is meant that the hydrogen is cooler than the slurry in the separator section 42. Additionally, a flushing liquid 54, such as vacuum gas oil (VGO), may be injected into the lower end 41 of the separator section 42, or any other part of the separator section 42, via a quench inlet 55 to cool and dilute the liquid slurry. This also slows the coking reactions and keeps the slurry from plugging. The VGO may be product of a vacuum distillation column (VDC) that recovers gas oil from the hydrocarbon feed, or other hydrocarbon liquid.

In embodiments, the liquid level may not be maintained in the separator section 42. Instead, the liquid level may be maintained in outlet piping (not shown). The separated liquid slurry can be conveyed to a hot low pressure separator in normal operation. For startup, shutdown and emergency operation, the liquid may be directed to a startup or drain drum.

In embodiments, a deflector may be positioned to induce a circuitous flow of the effluent 45, which then improves the vapor-liquid separation in the separator section 42. For example, a deflector plate 56 may be positioned in a transverse relationship to the vessel 37 such that axially aligned flow from the nozzle 43 impinges the deflector plate 56 and is re-directed in a radial direction to a wall forming the vessel 37. Generally, a majority of the fluid flow has been re-directed in a direction different from the direction of fluid flow before impingement. Additionally or alternatively, an elbow-shaped intake 58 may be fitted to and in fluid communication with the outlet 46 and oriented to receive a majority of non-axial flow, e.g., a radial flow. The elbow-shaped intake 58 may be a curved tubular member bent to point an opening at least partially radially outward. The circuitous path formed by the deflectors 56, 58 increases the time the fluid spends in the separator section 42, which then increases the amount of gas separated from the liquids and solids.

Figure 1:
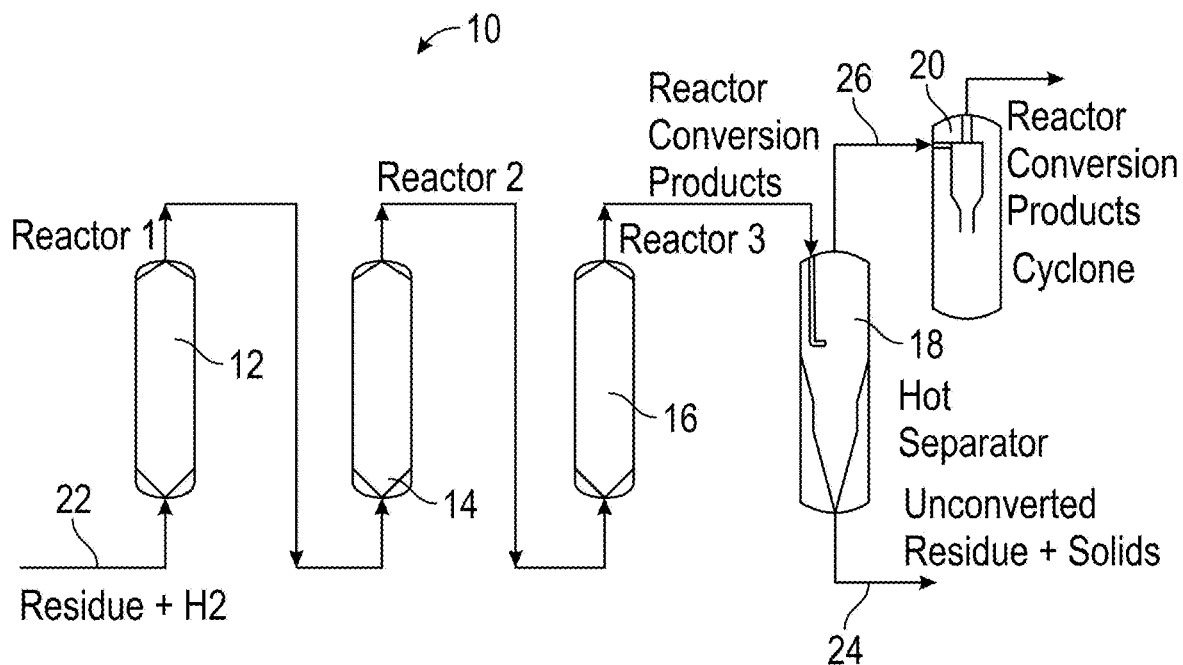
FIG. 1 schematically illustrates a prior art VCC slurry phase reactor and separation system.

It should be noted that the separator included in vessel 36 of FIGS. 2 and 3 eliminates the need for a separate hot separator 18 of FIG. 1. The main conversion products 47 are sent from the final stage reactor 36 directly into the cyclone separator 20 with no additional separation of phases. While some embodiments of a separation section 42 within reactor vessel 36 may not provide a separation of fluid phases to the same degree as a hot separator, the cyclone separator 20 will generally provide sufficient phase separation prior to additional hydrotreatment or other processing. It should also be noted that the FIG. 2 embodiment is susceptible to numerous embodiments. For example, while three reactors are shown, greater or fewer reactors may be used.

Figure 4:
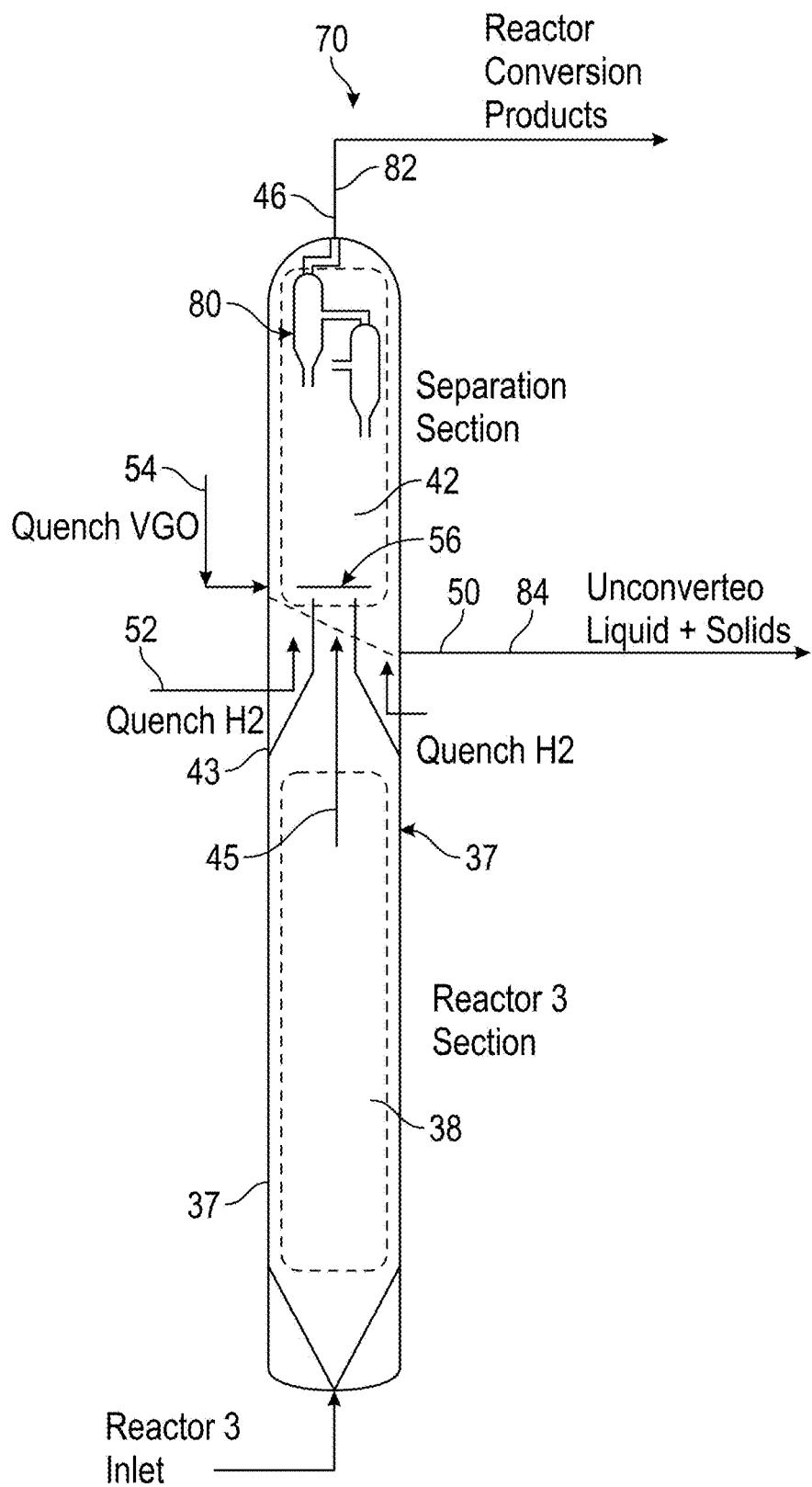
FIG. 4 schematically illustrates a final stage reactor according to one embodiment of the present disclosure that includes a cyclone separator.

FIG. 4 illustrates another embodiment of a final stage reactor. The final stage reactor 70 is similar to that of the combined final stage reactor and separator 36 of FIG. 3. Namely, the final stage reactor 70 includes a vessel 37 having a reactor section 38, a separator section 42, a nozzle 43 directing an effluent 45 to the separator section 42, and a deflector such as a plate 56. Also, the separator section 42 receives one or more streams 52 of cool hydrogen and a flushing liquid 54 as previously described.

Distinctively, the final stage reactor 70 includes a cyclone separator 80 positioned inside the separator section 42 of the vessel 37. The separator section 42 forms a first stream 82 comprising of substantially a gas that exits from the overhead vapor outlet 46 and a second stream 84 comprising substantially of a non-gas stream, e.g., unconverted liquids and solids, exit from a second outlet 50. By "substantially," it is meant that at least a majority of the stream 47 is a gas and a majority of the stream 48 is unconverted liquids and solids. In embodiments, "substantially" may mean at least 60%, 70%, 80%, or 90%.

The cyclone separator 80 uses rotational effects and gravity to separate droplets of liquid from a gaseous stream. In a cylindrical vessel that has a frustoconical section, vapor flows helically. The more dense components impinge on the inner surface of the cyclone wall and drain to the bottom while the lighter components exit at the top. The cyclone separator 80 may include one stage or multiple stages. The configuration and/or number of cyclone stages depends on the level of desired separation. For instance, in some embodiments, the cyclone separator 80 may be configured to produce a gas stream 47 that can go hydroprocessing without any further separation.

It should be noted that the separator included in vessel 36 of FIGS. 2 and 3 eliminates the need for a separate hot separator 18 of FIG. 1. The main conversion products 47 are sent from the final stage reactor 36 directly into the cyclone separator 20 with no additional separation of phases. While some embodiments of a separator section 42 within the reactor vessel 36 may not provide a separation of fluid phases to the same degree as a hot separator, the cyclone separator 20 will generally provide sufficient phase separation prior to additional hydrotreatment or other processing. It should also be noted that the FIG. 2 embodiment is susceptible to numerous embodiments. For example, while three reactors are shown, greater or fewer reactors may be used.

Some components of the system 30 are described in U.S. Pat. No. 4,851,107, the contents of which are incorporated by reference for all purposes. While the foregoing is directed to embodiments of the present disclosure, other and further embodiments of the disclosure may be devised without departing from the basic scope thereof, and the scope thereof is determined by the claims that follow.

What is claimed is:

1. A method for processing a hydrocarbon feed, comprising:
   flowing the hydrocarbon feed through a plurality of serially aligned reactors comprising a final stage reactor comprising a vessel having a reactor section and a separator section, the reactor section of the final stage reactor configured to receive an effluent from a previous aligned reactor;
   directing an effluent from the reactor section of the final stage reactor to the separator section of the final stage reactor via a nozzle;
   re-directing flow from the nozzle to a wall forming the vessel of the final stage reactor using a deflector plate positioned in the vessel; and
   forming a substantially gas stream and a substantially non-gas stream in the separator section of the final stage reactor,
   wherein a liquid is separated from a gas stream in the separator section of the final stage reactor via at least one cyclone separator located in the separator section of the final stage reactor.

2. The method of claim 1, further comprising:
   operating the plurality of serially aligned reactors between 200-350 bar;
   adding a solid additive to the hydrocarbon feed; and
   flowing a gaseous hydrogen through the hydrocarbon feed.

3. The method of claim 1, wherein the hydrocarbon feed is one of: (i) an atmospheric resid, (ii) a vacuum residue, (iii) coal, (iv) coal tar, (v) biomass, (vi) plastic, (vii) slurry oil, and (viii) visbreaker tar.

4. The method of claim 1, wherein a majority of the hydrocarbon feed boils above 350 degrees C. (662 degrees F.).

5. The method of claim 1, wherein the plurality of serially aligned reactors further includes a first stage reactor, and further comprising:
   firstly reacting the hydrocarbon feed in the first stage reactor; and
   lastly reacting the hydrocarbon feed in the final stage reactor,
   wherein the hydrocarbon feed is reacted with at least a first additive in the first stage reactor and reacted with at least a second additive in the final stage reactor.

6. The method of claim 5, wherein the first additive is selected from one of: activated carbon, iron, a metal based catalyst, carbon type impregnated with metal, and sodium salt, and the second additive is selected from one of: activated carbon, iron, a metal based catalyst, carbon type impregnated with metal, and sodium salt.

* * * * *